(12) United States Patent
Kurian (10) Patent No.: US 10,757,597 B1
(45) Date of Patent: Aug. 25, 2020

(54) RESOURCE STABILITY INDICATOR DETERMINATION BASED ON DOWNSTREAM NETWORK NODE-BASED RESOURCE HEALTH INDICATORS

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/505,224

(22) Filed: Jul. 8, 2019

(51) Int. Cl.
*H04L 12/26* (2006.01)
*H04W 28/02* (2009.01)
*H04W 24/10* (2009.01)

(52) U.S. Cl.
CPC .................... *H04W 24/10* (2013.01)

(58) Field of Classification Search
CPC ..... H04L 41/12; H04L 41/5009; H04L 43/08; H04L 43/0817; H04L 45/02; H04L 45/302; H04W 28/0268
USPC .................. 455/509; 709/200, 221, 222, 226
See application file for complete search history.

(56) References Cited

U.S. PATENT DOCUMENTS

| 6,202,053 | B1 | 3/2001 | Christiansen et al. |
| 7,668,776 | B1 | 2/2010 | Ahles |
| 8,239,677 | B2 | 8/2012 | Colson |
| 8,606,695 | B1 | 12/2013 | Arora et al. |
| 8,793,777 | B2 | 7/2014 | Colson |
| 9,349,145 | B2 | 5/2016 | Rozman et al. |
| 9,626,262 | B1 * | 4/2017 | Vogel .................. G06F 11/2033 |
| 10,223,745 | B1 | 3/2019 | Randhawa et al. |
| 2005/0131982 | A1 * | 6/2005 | Yamasaki ............... G06F 9/505 709/200 |
| 2012/0191826 | A1 * | 7/2012 | Gotesdyner ......... H04L 12/6418 709/221 |
| 2012/0246092 | A1 | 9/2012 | Stibel et al. |
| 2014/0038654 | A1 * | 2/2014 | Ahmadi .................. H04L 47/70 455/509 |
| 2014/0279392 | A1 | 9/2014 | Hayes et al. |
| 2014/0280952 | A1 * | 9/2014 | Shear ...................... H04L 63/10 709/226 |
| 2014/0359096 | A1 * | 12/2014 | Payette ............... H04L 41/0806 709/222 |
| 2016/0078556 | A1 | 3/2016 | Goldberg et al. |
| 2017/0083973 | A1 | 3/2017 | Robbins et al. |

(Continued)

*Primary Examiner* — Tan H Trinh
(74) *Attorney, Agent, or Firm* — Michael A. Springs; Moore & Van Allen PLLC; James C. Edwards (57) ABSTRACT

Resource health indication for new and/or emerging nodes is provided in the form of a a resource stability/confidence indicator that is based at least on, and in some instances solely on, the conventional resource health indicators of downstream nodes (i.e., nodes that receive resources from the new/emerging node in exchange for objects and/or services), and, in some embodiments, upstream nodes (i.e., nodes that receive objects and/or services from the emerging new node in exchange for resources) and/or secondary downstream and/or upstream nodes (i.e., nodes that receive or provide resources from or to the primary downstream and upstream nodes). The emerging/new node is provided with a resource stability indicator that can be used to acquire resources for obtaining objects and/or services from downstream nodes and/or provide confidence that the new/emerging node will provide objects/resources to upstream nodes.

17 Claims, 4 Drawing Sheets

(56) References Cited

U.S. PATENT DOCUMENTS

| | | | | |
|---|---|---|---|---|
| 2017/0134485 A1* | 5/2017 | Kim | .................... | H04L 67/1046 |
| 2018/0219753 A1* | 8/2018 | Arsenie | ................... | H04L 45/02 |
| 2018/0268302 A1* | 9/2018 | Tosh | .................... | G06F 9/5055 |
| 2018/0287911 A1* | 10/2018 | Gray | ................... | H04L 43/0811 |
| 2019/0014503 A1* | 1/2019 | Lightstone | ............ | H04W 24/08 |
| 2019/0155730 A1* | 5/2019 | Kumabe | ............. | G06F 12/0868 |

* cited by examiner

RESOURCE STABILITY INDICATOR DETERMINATION BASED ON DOWNSTREAM NETWORK NODE-BASED RESOURCE HEALTH INDICATORS

FIELD OF THE INVENTION

The present invention is generally related to resource stability/confidence of an emerging node and, more specifically, determining a resource stability/confidence indicator for an emerging node based on downstream and, in some instances upstream node-based resource health indicators.

BACKGROUND

In many instances a new and/or emerging node will have a resource health indicator that is inaccurate and/or unacceptable resource health indicator due to the minimal number of resource interactions conducted by the node. Such an unacceptable resource health indicator makes it difficult for the new and/or emerging node to acquire resources and/or conduct interactions requiring resources.

However, many new and emerging nodes may provide objects and/or services that are unique and highly innovative and, as such, are highly in demand by well-developed, established nodes and/or implement objects and/or services provided by well-developed, established nodes, both of which typically have well-developed and, in many instances, high-valued conventional resource health indicators.

Therefore, a need exists to develop systems, methods, computer program products and the like that provide new and/or emerging nodes with a resource stability/confidence indicator as the node emerges and/or until the node is well developed/established, such that the node acquires a well-developed high-valued conventional resource health indicators. Once the a new/emerging node has acquired a resource stability/confidence indicator, the indicator may be used to acquire further resources for acquiring objects and/services from downstream nodes or providing an indication of resource stability/confidence to upstream nodes seeking to acquire the objects and/or services from the new/emerging node.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like that present an alternate approach to resource health indication for new and/or emerging nodes. The present invention establishes a resource stability/confidence indicator that is based at least on, and in some instances solely on, the conventional resource health indicators of downstream nodes (i.e., nodes that receive resources from the new/ emerging node in exchange for objects and/or services). In specific embodiments of the invention, the resource health indicators received from the downstream nodes are weighted based on the volume of resources that each downstream node receives from the new/emerging node and, subsequently averaged to determine the emerging/new nodes resource stability/confidence indicator.

In other embodiments of the invention, the resource stability/confidence indicator is established is based on, the conventional resource health indicators of upstream nodes (i.e., nodes that receive objects and/or services from the emerging new node in exchange for resources) and/or the conventional resource health indicators of secondary downstream and/or upstream nodes (i.e., nodes that receive or provide resources from or to the primary downstream and upstream nodes).

As such, the present invention provides the emerging/new node with a resource stability indicator that can be used to acquire resources for obtaining objects and/or services from downstream nodes and/or provide confidence that the new/ emerging node will provide objects/resources to upstream nodes.

A system for resource stability indicator determination defines first embodiments of the invention. The system includes a distributed computing network and a plurality of primary downstream nodes disposed in the distributed computing network and in communication with a first node. The primary downstream nodes receive resources from the primary node in exchange of at least one of objects and services. The system additionally includes a computing platform including a memory and at least one processor in communication with the memory. The memory stores instructions that are executable by the at least one processor and configured to receive a plurality of first resource health indicators. Each of the first resource health indicators are associated with one of the plurality of primary downstream nodes. The instructions are further configured to determine a resource stability indicator for the first node based at least on the plurality of first resource health indicators and, some embodiments, based solely of the first resource health indicators. The resource stability indicator provides the first node with a capability for obtaining at least one of further objects and further services.

In specific embodiments of the system the instructions are further configured to determine the resource stability indicator by weighting each of the first resource health indicators based on a volume of resources that an associated primary downstream node receives from the first node.

In further specific embodiments the system includes a plurality of secondary downstream nodes disposed in the distributed computing network and in communication with at least one of the primary downstream nodes. The secondary downstream nodes receive resources from the at least one of the primary downstream nodes in exchange of at least one of objects and services. In such embodiments of the system the instructions are further configured to receive a plurality of second resource health indicators. Each of the second resource health indicators are associated with one of the plurality of secondary downstream nodes. In such embodiments of the system the instructions are further configured to determine the resource stability indicator for the first node based at least on the plurality of first resource health indicators and the second resource health indicators. In related embodiments of the system the instructions are further configured to determine the resource stability indicator by weighting the first resource health indicators higher than the second resource health indicators.

In still further specific embodiments the system includes a plurality of primary upstream nodes disposed in the distributed computing network and in communication with the first node. The primary upstream nodes provide resources to the first node in exchange of at least one of objects and services. In such embodiments of the system the instructions are further configured to receive a plurality of second resource health indicators. Each of the second resource health indicators are associated with one of the plurality of primary upstream nodes. The instructions are further configured to determine the resource stability indicator for the first node based at least on the plurality of first resource health indicators and the second resource health indicators. In related embodiments the system further includes a plurality of secondary upstream nodes disposed in the distributed computing network and in communication with at least one of the primary upstream nodes. The secondary upstream nodes receive resources from the at least one of the primary upstream nodes in exchange of at least one of objects and services. In such embodiments of the system the instructions are further configured to receive a plurality of third resource health indicators. Each of the third resource health indicators are associated with one of the plurality of secondary upstream nodes. In such embodiments of the system the instructions configured to determine further include instructions configured to determine the resource stability indicator for the first node based at least on the plurality of first resource health indicators, the second resource health indicators and the third resource health indicators.

A computer-implemented method for resource stability indicator determination defines second embodiments of the invention. The method is executed by one or more computing processing device and includes receiving a plurality of first resource health indicators. Each of the first resource health indicators are associated with one of a plurality of primary downstream nodes. The primary downstream nodes receive resources from a first node in exchange for at least one of objects and services. The method further includes determining a resource stability indicator for the first node based at least on, and in some embodiments based solely on, the plurality of first resource health indicators. The resource stability indicator provides the first node with a capability for obtaining at least one of further objects and further services.

In specific embodiments of the method determining further includes determining the resource stability indicator by weighting each of the first resource health indicators based on a volume of resources that an associated primary downstream node receives from the first node.

In still further specific embodiments the method includes receiving a plurality of second resource health indicators. Each of the second resource health indicators are associated with one of the plurality of secondary downstream nodes. The secondary downstream nodes receive resources from the at least one of the primary downstream nodes in exchange of at least one of objects and services. In such embodiments of the method determining further includes determining the resource stability indicator for the first node based at least on the plurality of first resource health indicators and the second resource health indicators. In related embodiments of the method determining further includes determining the resource stability indicator by weighting the first resource health indicators higher than the second resource health indicators.

In other specific embodiments the method further included receiving a plurality of second resource health indicators. Each of the second resource health indicators are associated with one of a plurality of primary upstream nodes. The primary upstream nodes provide resources to the first node in exchange of at least one of objects and services. In such embodiments of the method, determining further includes determining the resource stability indicator for the first node based at least on the plurality of first resource health indicators and the second resource health indicators.

A computer program product including a non-transitory computer-readable medium defines third embodiments of the invention. The computer readable medium includes a first set of codes for causing a computer to receive a plurality of first resource health indicators. Each of the first resource health indicators are associated with one of a plurality of primary downstream nodes. The primary downstream nodes receive resources from a first node in exchange for at least one of objects and services. The computer-readable medium additionally includes a second set of codes for causing a computer to determine a resource stability indicator for the first node based at least on the plurality of first resource health indicators. The resource stability indicator provides the first node with a capability for obtaining at least one of further objects and further services.

In specific embodiments of the computer program product the second set of codes is further configured to cause the computer to determine the resource stability indicator by weighting each of the first resource health indicators based on a volume of resources that an associated primary downstream node receives from the first node.

In other specific embodiments of the computer program product the computer-readable medium includes a third set of codes for causing a computer to receive a plurality of second resource health indicators. Each of the second resource health indicators are associated with one of the plurality of secondary downstream nodes. The secondary downstream nodes receive resources from the at least one of the primary downstream nodes in exchange of at least one of objects and services. In such embodiments of the computer program product the second set of codes is further configured to cause the computer to determine the resource stability indicator for the first node based at least on the plurality of first resource health indicators and the second resource health indicators.

In still further specific embodiments of the computer program the computer-readable medium includes a third set of codes for causing a computer to receive a plurality of second resource health indicators. Each of the second resource health indicators are associated with one of a plurality of primary upstream nodes. The first node resources from the primary upstream nodes in exchange for at least one of objects and services. In such embodiments of the computer program product, the second set of codes is further configured to cause the computer to determine the resource stability indicator for the first node based at least on the plurality of first resource health indicators and the second resource health indicators.

Thus, according to embodiments of the invention, which will be discussed in greater detail below, the present invention provides for an alternate approach to resource health indication for new and/or emerging nodes. Specifically, as described below, a resource stability/confidence indicator for new and/or emerging nodes is determined that is based at least on, and in some instances solely on, the conventional resource health indicators of downstream nodes (i.e., nodes that receive resources from the new/emerging node in exchange for objects and/or services), and, in some embodiments, upstream nodes (i.e., nodes that receive objects and/or services from the emerging new node in exchange for resources) and/or secondary downstream and/or upstream nodes (i.e., nodes that receive or provide resources from or to the primary downstream and upstream nodes). The determination may be weighted, such that downstream nodes that are provided more resources and/or upstream nodes that receive more resources are weighted more significantly in the determination process. As such, the present invention provides the emerging/new node with a resource stability indicator that can be used to acquire resources for obtaining objects and/or services from downstream nodes and/or provide confidence that the new/emerging node will provide objects/resources to upstream nodes.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that present an alternate approach to resource health indication for new and/or emerging nodes, referred to herein as primary nodes. The present invention establishes a resource stability/confidence indicator that is based at least on, and in some instances solely on, the conventional resource health indicators of downstream nodes (i.e., nodes that receive resources from the new/emerging node in exchange for objects and/or services). In specific embodiments of the invention, the resource health indicators received from the downstream nodes are weighted based on the volume of resources that each downstream node receives from the new/emerging node and, subsequently averaged to determine the emerging/new nodes resource stability/confidence indicator.

In other embodiments of the invention, the resource stability/confidence indicator is established is based on, the conventional resource health indicators of upstream nodes (i.e., nodes that receive objects and/or services from the emerging new node in exchange for resources) and/or the conventional resource health indicators of secondary downstream and/or upstream nodes (i.e., nodes that receive or provide resources from or to the primary downstream and upstream nodes). In specific embodiments of the invention, the resource health indicators from primary downstream or upstream nodes are weighted more heavily that resource indicators from secondary downstream or upstream nodes.

As a result, the present invention provides the emerging/new node with a resource stability/confidence indicator that can be used to acquire resources for obtaining objects and/or services from downstream nodes and/or provide confidence that the new/emerging node will provide objects/resources to upstream nodes.

Figure 1:
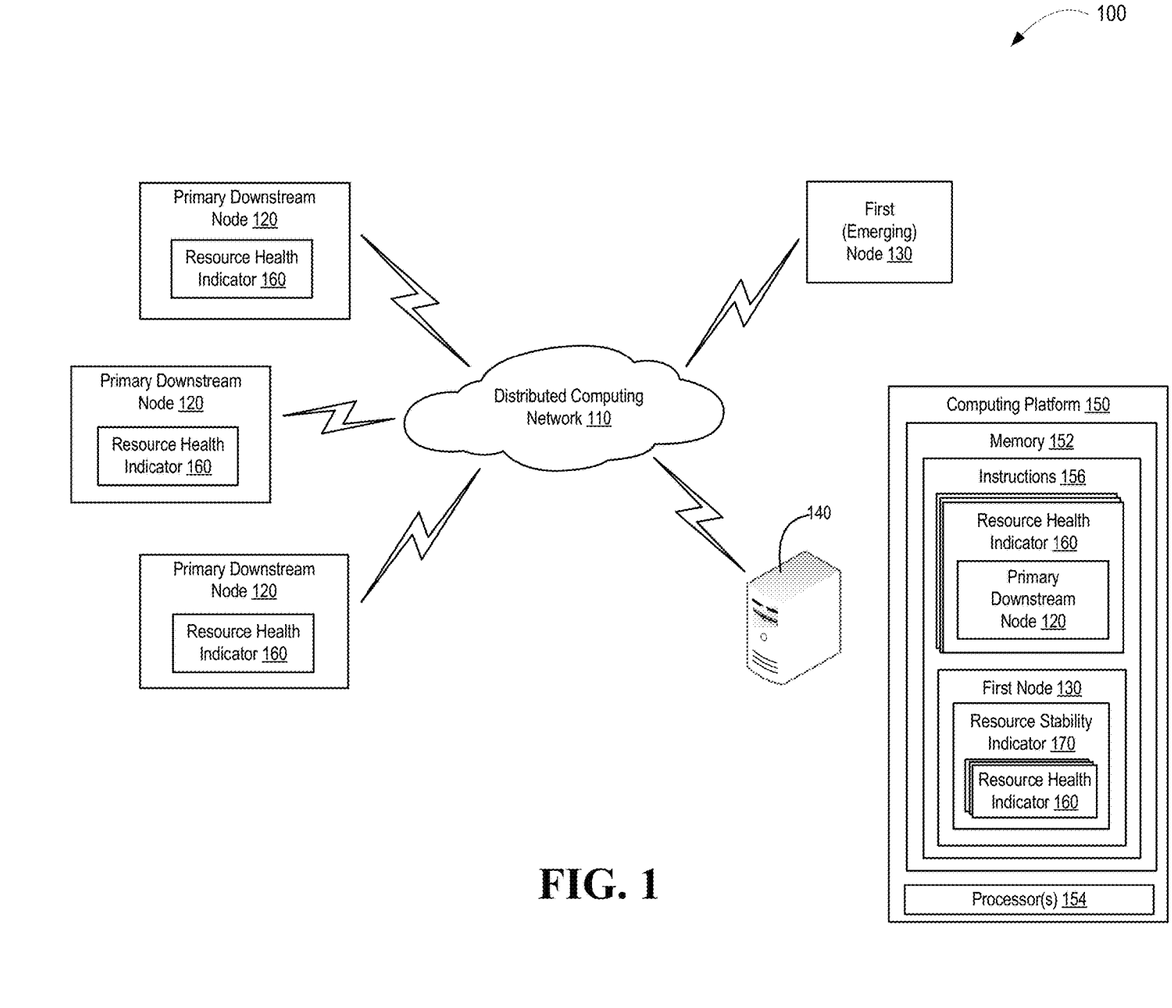
FIG. 1 is a schematic diagram of a system for determining resource stability indicators based on downstream node resource health indicators, in accordance with some embodiments of the present disclosure.

Turning now to the figures, FIG. 1 illustrates a system 100 for determining a resource stability indicator based on downstream network node resource health indicators, in accordance with embodiments of the present invention. The system is implemented in a distributed computing network 110, which includes a first node 130 (typically an emerging or new node) and a plurality of primary downstream nodes 120, which provide objects or services to the first node 130 in exchange for resources. Each of the primary downstream nodes 120 have an associated resource health indicator 160 that functions to indicate the node's ability to acquire resources.

The system additionally includes a computing apparatus, such as server 140 that includes a computing platform 150. The computing platform 150 includes a memory 152 and at least processor 154 in communication with memory 152. The memory 152 stores instructions 156 that are executable by the processor(s) 154. The instructions 156 are configured to receive a plurality of resource health indicators 160 associated with the primary downstream nodes 120. The resource health indicators 160 may be received directly from the primary downstream nodes 120 are from a third-party entity (not shown in FIG. 1) resource health indicator determining entity or the like.

The instructions 156 are further configured to determine or otherwise establish a resource stability indicator 170 for the first node 130 based at least on, and in some embodiments based solely on, the received plurality of resource health indicators 160. The resource stability indicator 170 provides the first node with a measurable index that indicates a capability for obtaining at least one of further objects and further services from the primary downstream nodes 120 associated with the resource health indicators 160 and/or other downstream nodes. The resource stability indicator 170 additionally indicates a level of confidence in providing upstream nodes with at least one of objects and services.

In specific embodiments of the system, first node 130 is a new and/or emerging business entity and the downstream nodes 120 are business entities that provide goods or services to the new and/or emerging business entity in exchange for financial resources. In such embodiments of the system, the resource health indicator may be a credit rating/score or other conventional rating/score configured to indicate the financial health of the business entities (i.e., downstream nodes 120). Since the first node 130 is a new and/or emerging business entity, the first node 130 may not have or may not have an accurate credit rating/score or other conventional rating/score configured to indicate their financial health (i.e., resource health indicator). In such embodiments of the system, the instructions 156 are configured to receive the credit rating/score or other conventional rating/score associated with the downstream business entities and determine/establish a resource stability indicator, which indicates the financial stability/confidence of the new and/or emerging business entity, based at least in part, and in some embodiments based solely, on the received accurate credit rating/score or other conventional rating/score associated with the downstream business entities. In this regard, the new and/or emerging business entity is leveraging the credit rating/score or other conventional rating/score of their downstream suppliers to establish an indicator that the new and/or emerging business entity may use to acquire further goods or services or provide a level of confidence to upstream suppliers that the new and/or emerging business entity is capable of providing goods or services.

Figure 2:
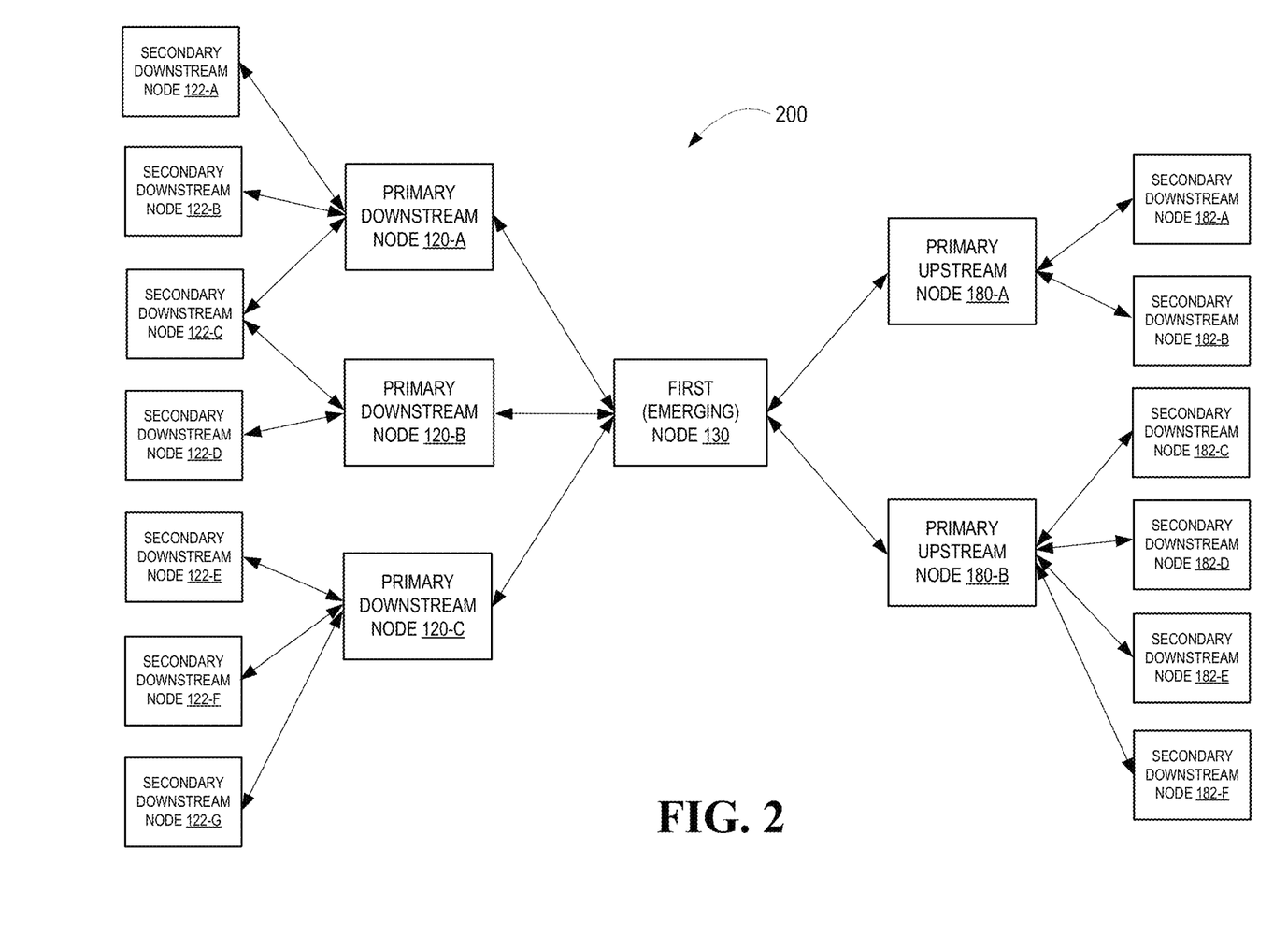
FIG. 2 is a schematic diagram illustrating primary and secondary downstream node relationships and primary and secondary upstream node relationships, in accordance with some embodiments of the present disclosure.

Referring to FIG. 2, a schematic diagram is showing of a system 200 that highlights the relationship between a first node and primary and secondary downstream nodes and primary and secondary upstream nodes, in accordance with embodiments of the present invention. As will be discussed in greater detail with respect to FIGS. 3 and 4 in optional embodiments of the invention the resource stability indicator in based, not only, on the resource health indicators associated with the primary downstream nodes 120 but also on resource health indicators associated with secondary downstream nodes 122 and/or primary and/or secondary upstream nodes 180 and 182. Secondary downstream nodes 122 provide objects and/or services to one or more primary downstream nodes 120 in exchange for resources. The objects and/or services provided by the secondary downstream nodes 122 are used in the objects and/or services subsequently provided by the primary downstream node 122 to the first node 130. Primary upstream nodes 180 receive objects and/or services from the first node in exchange for resources. Secondary upstream nodes 182 receive objects and/or services from one or more of the primary upstream nodes 180 in exchange for resources. The objects and/or services provided to the secondary upstream nodes 182 include an object and/or service provided to the primary upstream 180 from the first node 130.

In specific embodiments of the invention, in which the first node 130 is a new and/or emerging business entity and the primary downstream nodes 120 are business entities that supply goods or services to the new and/or emerging business entities, the secondary downstream nodes 122 are business entities that supply goods or services to the primary downstream nodes 120 in exchange for financial resources (in which the goods and goods or services supplied to the primary downstream business entity/node 120 by the secondary downstream business entity/node 122 are subsequently included in the goods or services supplied to the new and/emerging business entity/first node 130). In further such embodiments of the invention, the primary upstream nodes 180 are business entities that receive goods or services from the new and/or emerging business entity/first node 130 in exchange for financial resources. In such embodiments of the invention, The system additionally includes a computing apparatus, such as server 140 that includes a computing platform 150. The computing platform 150 includes a memory 152 and at least processor 154 in communication with memory 152. The memory 152 stores instructions 156 that are executable by the processor(s) 154. The instructions 156 are configured to receive a plurality of resource health indicators 160 associated with the primary downstream nodes 120. The resource health indicators 160 may be received directly from the primary downstream nodes 120 are from a third-party entity (not shown in FIG. 1) resource health indicator determining entity or the like.

The instructions 156 are further configured to determine or otherwise establish a resource stability indicator 170 for the first node 130 based at least on, and in some embodiments based solely on, the received plurality of resource health indicators 160. The resource stability indicator 170 provides the first node with a measurable index that indicates a capability for obtaining at least one of further objects and further services from the primary downstream nodes 120 associated with the resource health indicators 160 and/or other downstream nodes. The resource stability indicator 170 additionally indicates a level of confidence in providing upstream nodes with at least one of objects and services.

In the illustrated example of FIG. 2, first emerging node 130 has three primary downstream nodes 120A, 120B and 120C, which provide the primary node 130 with objects and/or services in exchange for resources. Primary downstream node 120-A has three secondary downstream nodes 122A, 122B, 122C, which provide the primary downstream node 120-A with objects and/or services (used by the primary downstream node 120-A in the objects and/or services provided to the primary node 130) in exchange for resources. Primary downstream node 120-B has two secondary downstream nodes 122-C, 122-D, which provide the primary downstream node 120-B with objects and/or services (used by the primary downstream node 120-B in the objects and/or services provided to the primary node 130) in exchange for resources. Primary downstream nodes 120-C has three secondary downstream nodes 122E, 122F, 122G, which provide the primary downstream node 120-C with objects and/or services (used by the primary downstream node 120-C in the objects and/or services provided to the primary node 130) in exchange for resources. It should be noted that secondary downstream node 122C provides objects and/or services to both primary downstream node 120-A and 120-B and, as such, the determination of the resource stability indicator 160 (shown in FIG. 1) may take this into account as a weighting factor discussed, infra. Moreover, a primary downstream node 120 of the first node may act as secondary downstream node of the first node (i.e., one of the primary downstream nodes may provide objects and/or services to another one of the primary downstream nodes) and, as such, the determination of the resource stability indicator (shown in FIG. 1) may take this into account as a weighting factor discussed, infra.

Figure 3:
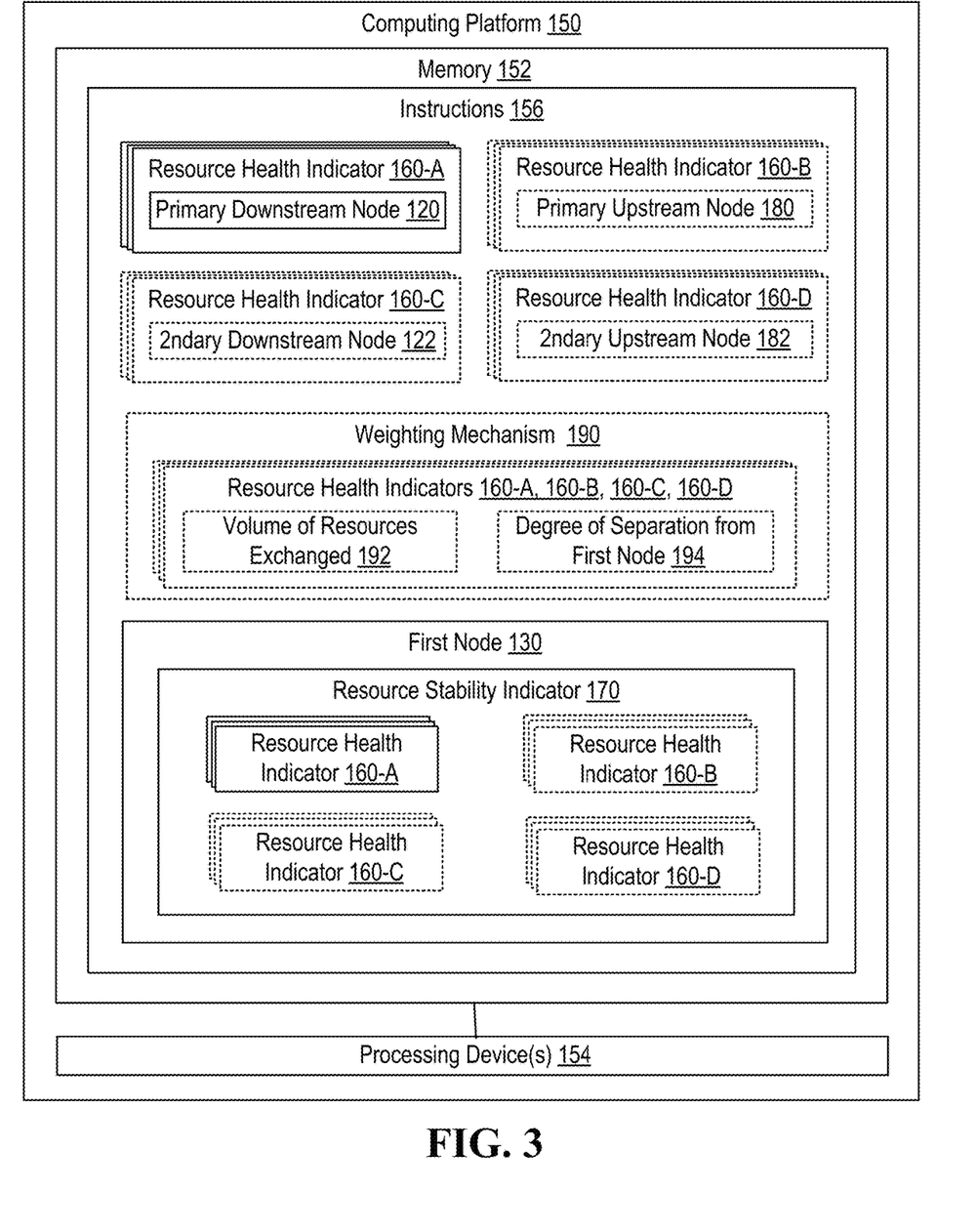
FIG. 3 is a schematic diagram of a computing platform having instructions for determining a resource stability indicator, in accordance with embodiment of the present invention.

Referring to FIG. 3 a block diagram is depicted of the computing platform 150 having instructions 156 for determining a resource health stability 170 based on downstream/ upstream node's resource health indicators 160, in accordance with embodiments of the present invention. Computing platform 150, which comprises one or more computing devices (e.g., servers or the like), is configured to execute instructions 156, such as algorithms, modules, routines, applications and the like. Computing platform 150 includes memory 152, which may comprise volatile and non-volatile memory, such as read-only and/or random-access memory (RAM and ROM), EPROM, EEPROM, flash cards, or any memory common to computing platforms). Moreover, memory 152 may comprise cloud storage, such as provided by a cloud storage service and/or a cloud connection service.

Further, computing platform 150 also includes at least one processing device 154, which may be an application-specific integrated circuit ("ASIC"), or other chipset, logic circuit, or other data processing device. Processing device(s) 154 may execute one or more application programming interface (APIs) (not shown in FIG. 3) that interface with any resident programs, such as instructions 156 or the like, stored in the memory 152 of the computing platform 150 and any external programs. Processing devices(s) 154 may include various processing subsystems (not shown in FIG. 3) embodied in hardware, firmware, software, and combinations thereof, that enable the functionality of computing platform 150 and the operability of the computing platform 150 on the distributed computing network 110 (shown in FIG. 1). For example, processing subsystems allow for initiating and maintaining communications and exchanging data with other networked devices. For the disclosed aspects, processing subsystems of processing device 152 may include any subsystem used in conjunction with instructions 156 and related tools, routines, sub-routines, algorithms, sub-algorithms, sub-modules thereof.

Computing platform 150 may additionally include a communications module (not shown in FIG. 3) embodied in hardware, firmware, software, and combinations thereof, that enables electronic communications between the computing platform 150 and other network devices. Thus, communication module may include the requisite hardware, firmware, software and/or combinations thereof for establishing and maintaining a network communication connection with one or more network devices.

Memory 152 of computing apparatus 150 stores instructions 155 that are configured to receive a plurality of resource health indicators 160-A associated with primary downstream nodes 120, which receive resources from the first node 130 in exchange for objects and/or services. In optional embodiments of the invention, the instructions 155 may be configured to receive one or more of (i) a plurality of resource health indicators 160-B associated with primary upstream nodes 180, which provides resources to the first node 130 in exchange for objects and/or service, (ii) a plurality of resource health indicators 160-C associated with secondary downstream nodes 122, which receive resources from one or more of the primary downstream nodes 120 in exchange for objects and/or services, and (iii) a plurality of resource health indicators 160-D associated with secondary upstream nodes 182, which receive resources from one or more of the primary upstream nodes 180 in exchange for objects and/or services. While the embodiments shown and described in FIG. 2 are limited to receiving resource health indicators from primary and secondary downstream and upstream nodes 120, 122, 180 and 182 it should be noted that in other embodiments of the invention, resource health indicators may be received (and the resource stability indicator determined based on) other levels of upstream and downstream nodes, such as tertiary nodes and the like.

In those embodiments of the invention in which the primary downstream nodes are business entities that supply goods and/services to the new and/or emerging business entity/first node 130 in exchange for financial resources and the resource health indicators are credit ratings/scores or other conventional ratings/scores configured to indicate the financial health of the business entities, the secondary downstream indicators 122 are business entities that supply goods and/services to one or more of the primary downstream nodes 120 in exchange for financial resources. In addition, the primary upstream nodes 180 are business entities that receive goods and/or services from the new and/or emerging business entity/first node 130 in exchange for financial resources and the secondary upstream nodes are business entities that receive goods and/or services from the primary upstream nodes 130 in exchange for financial resources.

In optional embodiments of the invention, the instructions 156 include a weighting mechanism 190 that is configured to weight the resource health indicators 156 based on the volume of resources exchanged 192 with the downstream nodes 120, 122 and/or upstream nodes 180, 182 and/or the degree of separation 194 from the first node 130. For example, in specific embodiments of the invention, the resource health indicators 160 associated with downstream nodes 120, 122 that receive a higher volume of resources in exchange for objects and/or services are provided a higher weighting factor than downstream nodes that receive a lower volume of resources in exchange for objects and/or services. In other examples, resource health indicators 160 associated with primary downstream or upstream nodes 120 and 180 are provided a higher weighting factor than secondary downstream or upstream nodes 122 and 182.

In specific embodiments of the invention, in which the nodes are business entities that supply goods and/or services to one another, the weighting mechanism 190 is configured to weight the credit ratings/scores or other conventional ratings/scores based on the volume of financial resources 192 provided to or from a downstream or upstream business entity and/or the degree of separation 194 that an downstream or upstream business entity has to the new and/or emerging business entity.

The instructions 156 are additionally configured to determine a resource stability indicator 170 for the first node 130 based at least on the resource health indicators 160-A associated with the primary downstream nodes 120. In specific embodiments of the invention, the resource stability indicator is based solely on the resource health indicators 160-A associated with the primary downstream nodes 120. In other embodiments of the invention, the resource stability indicator 170 is based additionally on one or more of the (i) the resource health indicators 160-B associated with the primary upstream nodes 180, (ii) the resource health indicators 160-C associated with the secondary downstream nodes 122, and (iii) the resource health indicators 160-D associated with the secondary upstream nodes 182. In specific embodiments of the invention, the resource stability indicator 170 determination is conducted by weighting the resource health indicators 160A, 160-B, 160C and/or 160D, summing the weighted resource health indicators and averaging the summed weighted resource health indicators to result in a resource stability indicator/score 170. As previously discussed, the resource stability The resource stability indicator 170 provides the first node with a measurable index that indicates a capability for obtaining at least one of further objects and further services from the primary downstream nodes 120 associated with the resource health indicators 160 and/or other downstream nodes. The resource stability indicator 170 additionally indicates a level of confidence in providing upstream nodes with at least one of objects and services.

In alternate embodiments of the invention, the resource stability indicator 170 may be based on the resource health indicators 160-A, 160-B, 160-C and 160-D of the downstream and upstream nodes 120, 122, 180, 182, as well as, the resource health indicator of the first node 130. The degree to which the resource health indicator of the first node is a factor in the resource stability indicator may be based on the longevity of the first node 130 and the degree of accuracy achieved of the resource health indicator of the first node 130.

In those embodiments of the invention in which the nodes are business entities that supply goods and services to one another, the financial stability indicator 170 acts an alternate means of providing a new and/or emerging business entity with a financial credit and/or confidence indicator/score in the absence of a conventional credit score/rating (or in instances in which the conventional credit score/rating provides an inaccurate picture of the new and/or emerging entities financial outlook due to minimal financial transactions with the upstream and downstream business entities).

Figure 4:
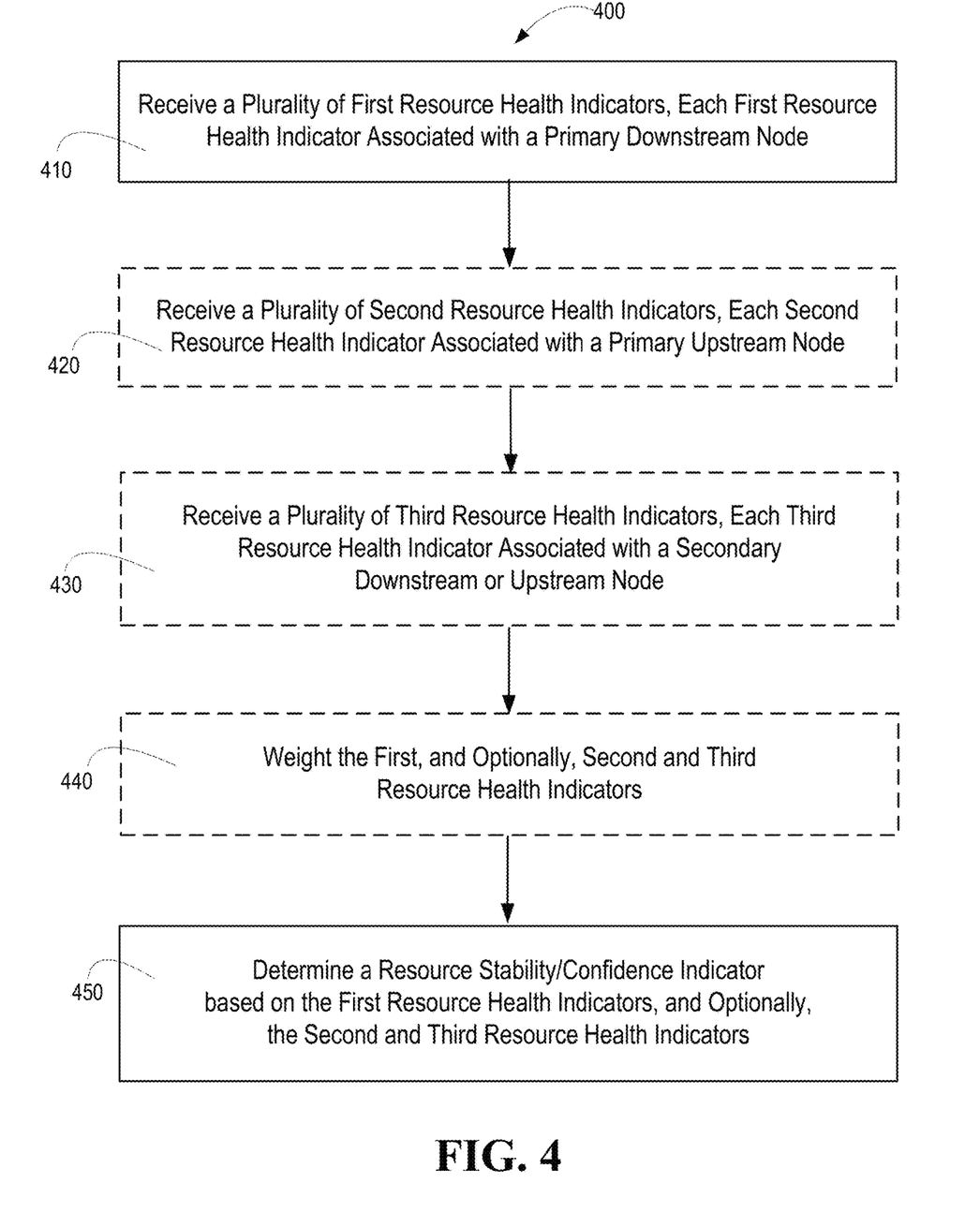
FIG. 4 is a flow diagram of a method for determining a resource stability indicator based on downstream and optionally upstream resource health indicators, in accordance with some embodiments of the present disclosure.

Referring to FIG. 4 a flow diagram is presented of a method 400 for determining/establishing a resource stability indicator for a node in a distributed computing network, in accordance with embodiments of the present invention. At Event 410, a plurality of first resource health indicators are received. Each first resource health indicators is associated with a primary downstream node, which receives resources from a first node in exchange for objects and/or services. At optional Event 420, a plurality of second resource health indicators are received. Each second resource health indicators is associated with a primary upstream node, which provides resources to the first node in exchange for objects and/or services. At optional Event 430, a plurality of third resource health indicators are received. Each third resource health indicator is associated with a secondary upstream node, which provides resources to the at least one primary upstream node in exchange for objects and/or services or a secondary downstream node, which receives resources from at least one primary downstream node in exchange for objects and services.

At optional Event 440, the resource health indicators are weighted. Weighting of the resource health indicators may be based on at least one of (i) the volume of resources exchanged between the primary downstream or upstream node and the first node or between the secondary downstream or upstream node, and/or (ii) the degree of separation for the first node.

At Event 450, a resource stability/confidence indicator is determined for the first node based on the first resource health indicators and, optionally, the second and/or third resource health indicators. The resource stability indicator 170 provides the first node with a measurable index that indicates a capability for obtaining at least one of further objects and further services from the primary downstream nodes 120 associated with the resource health indicators 160 and/or other downstream nodes. The resource stability indicator 170 additionally indicates a level of confidence in providing upstream nodes with at least one of objects and services.

Thus, present embodiments of the invention provides for an alternate approach to resource health indication for new and/or emerging nodes. Specifically, as described below, a resource stability/confidence indicator for new and/or emerging nodes is determined that is based at least on, and in some instances solely on, the conventional resource health indicators of downstream nodes (i.e., nodes that receive resources from the new/emerging node in exchange for objects and/or services), and, in some embodiments, upstream nodes (i.e., nodes that receive objects and/or services from the emerging new node in exchange for resources) and/or secondary downstream and/or upstream nodes (i.e., nodes that receive or provide resources from or to the primary downstream and upstream nodes). The determination may be weighted, such that downstream nodes that are provided more resources and/or upstream nodes that receive more resources are weighted more significantly in the determination process. As such, the present invention provides the emerging/new node with a resource stability indicator that can be used to acquire resources for obtaining objects and/or services from downstream nodes and/or provide confidence that the new/emerging node will provide objects/resources to upstream nodes.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for resource stability indicator determination, the system comprising:
   a distributed computing network;
   a plurality of primary downstream nodes disposed in the distributed computing network and in communication with a first node, wherein the primary downstream nodes receive resources from the primary node in exchange of at least one of objects and services;
   a computing platform including a memory and at least one processor in communication with the memory, wherein the memory stores instructions that are executable by the at least one processor and configured to:
      receive a plurality of first resource health indicators, wherein each of the first resource health indicators are associated with one of the plurality of primary downstream nodes, and
      determine a resource stability indicator for the first node based at least on the plurality of first resource health indicators by weighting each of the first resource health indicators based on a volume of resources that an associated primary downstream node receives from the first node,
      wherein the resource stability indicator provides the first node with a capability for obtaining at least one of further objects and further services.

2. The system of claim 1, wherein the instructions are further configured to determine the resource stability indicator for the primary node based solely on the plurality of resource health indicators.

3. The system of claim 1, further comprising a plurality of secondary downstream nodes disposed in the distributed computing network and in communication with at least one of the primary downstream nodes, wherein the secondary downstream nodes receive resources from the at least one of the primary downstream nodes in exchange of at least one of objects and services.

4. The system of claim 3, wherein the instructions are further configured to:
   receive a plurality of second resource health indicators, wherein each of the second resource health indicators are associated with one of the plurality of secondary downstream nodes, and
   determine the resource stability indicator for the first node based at least on the plurality of first resource health indicators and the second resource health indicators.

5. The system of claim 4, wherein the instructions are further configured to determine the resource stability indicator by weighting the first resource health indicators higher than the second resource health indicators.

6. The system of claim 1, further comprising a plurality of primary upstream nodes disposed in the distributed computing network and in communication with the first node, wherein the primary upstream nodes provide resources to the first node in exchange of at least one of objects and services.

7. The system of claim 6, wherein the instructions are further configured to
   receive a plurality of second resource health indicators, wherein each of the second resource health indicators are associated with one of the plurality of primary upstream nodes, and
   determine the resource stability indicator for the first node based at least on the plurality of first resource health indicators and the second resource health indicators.

8. The system of claim 7, further comprising a plurality of secondary upstream nodes disposed in the distributed computing network and in communication with at least one of the primary upstream nodes, wherein the secondary upstream nodes receive resources from the at least one of the primary upstream nodes in exchange of at least one of objects and services.

9. The system of claim 8, wherein the instructions are further configured to:
   receive a plurality of third resource health indicators, wherein each of the third resource health indicators are associated with one of the plurality of secondary upstream nodes,
   wherein the instructions configured to determine further comprises instructions configured to determine the resource stability indicator for the first node based at least on the plurality of first resource health indicators, the second resource health indicators and the third resource health indicators.

10. A computer-implemented method for resource stability indicator determination, the method executed by one or more computing processing device and comprising:
    receiving a plurality of first resource health indicators, wherein each of the first resource health indicators are associated with one of a plurality of primary downstream nodes, wherein the primary downstream nodes receive resources from a first node in exchange for at least one of objects and services, and
    determining a resource stability indicator for the first node based at least on the plurality of first resource health indicators by weighting each of the first resource health indicators based on a volume of resources that an associated primary downstream node receives from the first node,
    wherein the resource stability indicator provides the first node with a capability for obtaining at least one of further objects and further services.

11. The computer-implemented method of claim 10, wherein determining further comprises determining the resource stability indicator for the primary node based solely on the plurality of resource health indicators.

12. The computer-implemented method of claim 10, further comprising:
receiving a plurality of second resource health indicators, wherein each of the second resource health indicators are associated with one of the plurality of secondary downstream nodes, wherein the secondary downstream nodes receive resources from the at least one of the primary downstream nodes in exchange of at least one of objects and services, and
wherein determining further comprises determining the resource stability indicator for the first node based at least on the plurality of first resource health indicators and the second resource health indicators.

13. The computer-implemented method of claim 12, wherein
determining further comprises determining the resource stability indicator by weighting the first resource health indicators higher than the second resource health indicators.

14. The computer-implemented method of claim 10, further comprising:
receiving a plurality of second resource health indicators, wherein each of the second resource health indicators are associated with one of a plurality of primary upstream nodes, wherein the primary upstream nodes provide resources to the first node in exchange of at least one of objects and services,
wherein determining further comprises determining the resource stability indicator for the first node based at least on the plurality of first resource health indicators and the second resource health indicators.

15. A computer program product comprising:
a non-transitory computer-readable medium comprising:
a first set of codes for causing a computer to receive a plurality of first resource health indicators, wherein each of the first resource health indicators are associated with one of a plurality of primary downstream nodes, wherein the primary downstream nodes receive resources from a first node in exchange for at least one of objects and services, and
a second set of codes for causing a computer to determine a resource stability indicator for the first node based at least on the plurality of first resource health indicators by weighting each of the first resource health indicators based on a volume of resources that an associated primary downstream node receives from the first node,
wherein the resource stability indicator provides the first node with a capability for obtaining at least one of further objects and further services.

16. The computer program product of claim 15, further comprising:
a third set of codes for causing a computer to receive a plurality of second resource health indicators, wherein each of the second resource health indicators are associated with one of the plurality of secondary downstream nodes, wherein the secondary downstream nodes receive resources from the at least one of the primary downstream nodes in exchange of at least one of objects and services, and
wherein the second set of codes is further configured to cause the computer to determine the resource stability indicator for the first node based at least on the plurality of first resource health indicators and the second resource health indicators.

17. The computer program product of claim 15, further comprising:
a third set of codes for causing a computer to receive a plurality of second resource health indicators, wherein each of the second resource health indicators are associated with one of a plurality of primary upstream nodes, wherein the first node resources from the primary upstream nodes in exchange for at least one of objects and services, and
wherein the second set of codes is further configured to cause the computer to determine the resource stability indicator for the first node based at least on the plurality of first resource health indicators and the second resource health indicators.

* * * * *